US011480957B2

(12) United States Patent
Shimamoto et al.

(10) Patent No.: US 11,480,957 B2
(45) Date of Patent: Oct. 25, 2022

(54) VEHICLE CONTROL SYSTEM

(71) Applicant: HONDA MOTOR CO., LTD., Tokyo (JP)

(72) Inventors: Gaku Shimamoto, Saitama (JP); Junpei Noguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 88 days.

(21) Appl. No.: 17/028,141

(22) Filed: Sep. 22, 2020

(65) Prior Publication Data

US 2021/0089021 A1 Mar. 25, 2021

(30) Foreign Application Priority Data

Sep. 24, 2019 (JP) .............................. JP2019-173201

(51) Int. Cl.
*G05D 1/00* (2006.01)
(52) U.S. Cl.
CPC ......... *G05D 1/0016* (2013.01); *G05D 1/0022* (2013.01); *G05D 1/0038* (2013.01); *G05D 1/0055* (2013.01)
(58) Field of Classification Search
CPC .. G05D 1/0016; G05D 1/0022; G05D 1/0038; G05D 1/0055
See application file for complete search history.

(56) References Cited

U.S. PATENT DOCUMENTS

| 2018/0148094 | A1 | 5/2018 | Mukaiyama |
| 2019/0220001 | A1* | 7/2019 | Lavoie ..................... B62D 1/00 |
| 2020/0201320 | A1 | 6/2020 | Yamaguchi |
| 2021/0053621 | A1 | 2/2021 | Mukaiyama |

FOREIGN PATENT DOCUMENTS

| JP | 2007295033 A | 11/2007 |
| JP | 2015089733 A | 5/2015 |
| JP | 2016097927 A | 5/2016 |
| JP | 2017007399 A | 1/2017 |
| JP | 2017077749 A | 4/2017 |
| JP | 2018086920 A | 6/2018 |
| JP | 2018176823 A | 11/2018 |
| JP | 2019057767 A | 4/2019 |

OTHER PUBLICATIONS

Notice of Reasons for Refusal for Patent Application JP 2019-173201 dated Apr. 19, 2022; 8 pp.

* cited by examiner

*Primary Examiner* — Anne Marie Antonucci
*Assistant Examiner* — Jingli Wang
(74) *Attorney, Agent, or Firm* — Armstrong Teasdale LLP

(57) ABSTRACT

A vehicle control system includes: a control device mounted on a vehicle and configured to execute remote automatic moving processing; an operation terminal configured to be carried by a user and to transmit a control signal to the control device based on an input by the user; and a position determination unit mounted on the vehicle and/or the operation terminal and configured to measure a distance between the operation terminal and the vehicle. When the control device determines that the distance exceeds a first threshold based on a signal from the position determination unit, the control device stops the vehicle and transmits an output signal to the operation terminal, the output signal being a signal to cause the operation terminal to output a fact that the distance exceeds the first threshold.

4 Claims, 17 Drawing Sheets

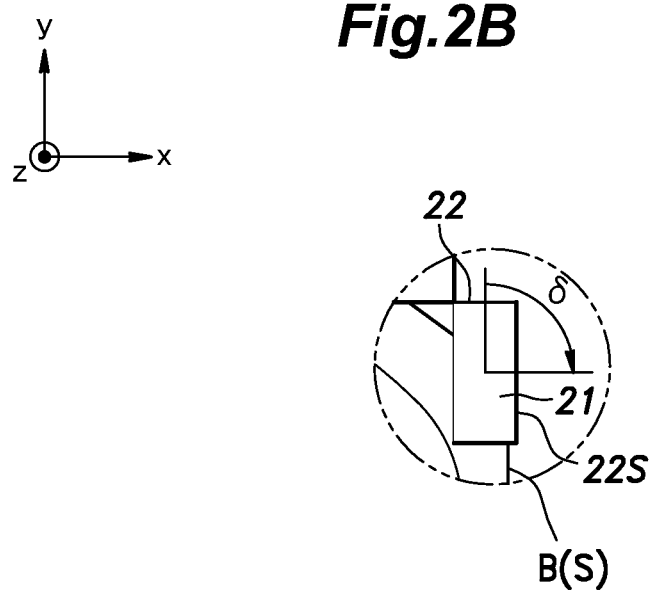

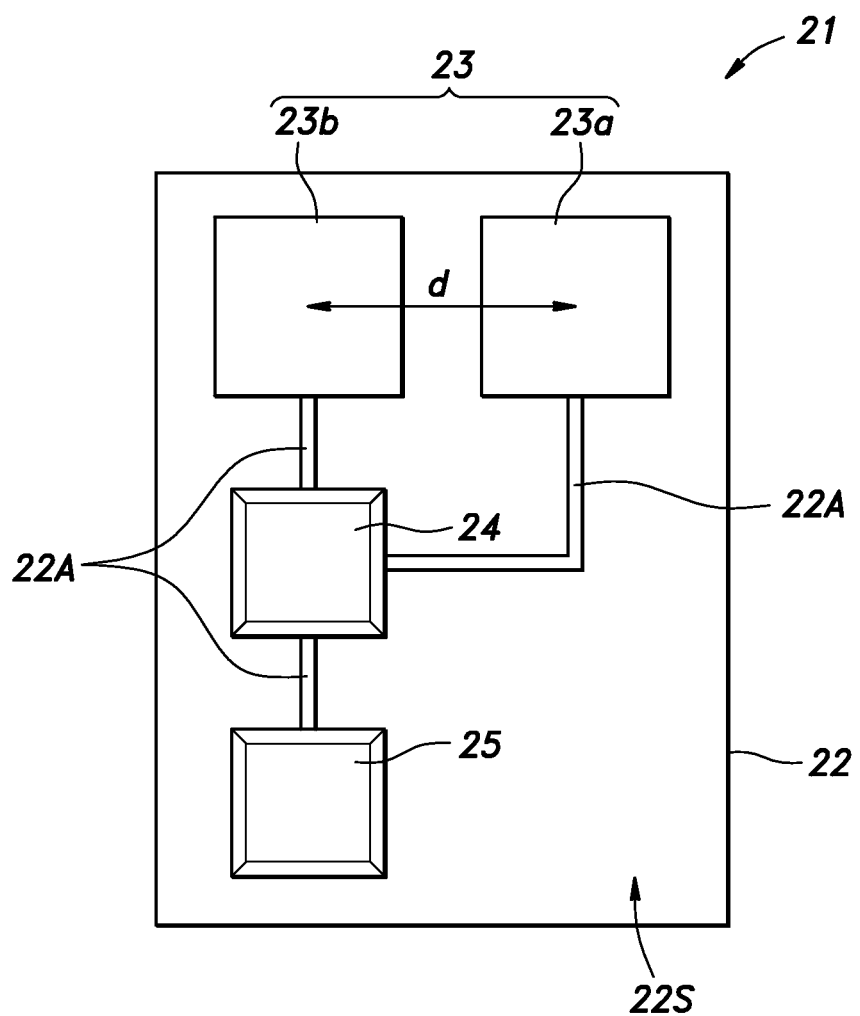

*Fig.7A* reference table

| unit ID | reference position P [mm] | | | reference angle $\delta$ [deg] | initial angle $\phi$ [deg] | initial intensity $I_0$ [arb.unit] |
| --- | --- | --- | --- | --- | --- | --- |
| | x | y | z | | | |
| 1 | −750 | 2000 | 200 | 0 | −30.0 | 0.5 |
| 2 | 750 | 2000 | 200 | 0 | 30.0 | 0.5 |
| ⋮ | ⋮ | ⋮ | ⋮ | ⋮ | ⋮ | ⋮ |

Fig.7B correction table

| unit ID | reception intensity I [arb. unit] | intensity determination result | arrival angle θ [deg] | correction angle ε [deg] | correction determination result |
|---|---|---|---|---|---|
| 1 | 0.49 | ○ | −29.9 | +0.01 | ○ |
| 2 | 0.51 | ○ | 30.1 | −0.01 | ○ |
| ⋮ | ⋮ | ⋮ | ⋮ | ⋮ | ⋮ |

VEHICLE CONTROL SYSTEM

TECHNICAL FIELD

The present invention relates to a vehicle control system that can execute remote automatic moving processing according to a remote operation of a vehicle by using an operation terminal carried by a user.

BACKGROUND ART

When remote automatic moving processing (for example, remote parking processing) according to a remote operation is executed, it is desirable that a user is present within a prescribed distance from a vehicle so that the user can monitor the vehicle. For example, JP2015-89733A discloses a parking assist system that stops a vehicle when a distance between the vehicle and a mobile terminal exceeds a prescribed value during remote parking processing.

Also, in order to cause the user to monitor the vehicle, JP2017-77749A discloses a parking assist device that stops the vehicle when the user (more specifically, a mobile terminal carried by the user) does not transmit a response signal to a notification signal within a prescribed time after the vehicle transmits the notification signal to the user during automatic parking processing. While this kind of control is executed, the user needs to continuously transmit the response signal (namely, to continuously monitor the vehicle) within the prescribed time to cause the vehicle to travel to a parking position.

However, in the parking assist system disclosed in JP2015-89733A, the user may not be able to recognize the reason why the vehicle has stopped. Further, in the parking assist device disclosed in JP2017-77749A, the user may pay attention to the presence/absence of the notification signal from the vehicle, and thus may not pay enough attention to the surroundings of the vehicle.

SUMMARY OF THE INVENTION

In view of such a problem of the prior art, a primary object of the present invention is to provide a vehicle control system that can call user's attention when a relative distance between a user and a vehicle exceeds a prescribed value and thus the vehicle stops during remote automatic moving processing of the vehicle according to a remote operation. Further, a primary object of at least some embodiments of the present invention is to provide a vehicle control system that does not prevent the user from monitoring the surroundings of the vehicle.

To achieve such an object, one embodiment of the present invention provides a vehicle control system (1) including: a control device (15) mounted on a vehicle (S) and configured to execute remote automatic moving processing based on an output from an external environment sensor (7), the remote automatic moving processing being processing to move the vehicle from an initial position to a stop position and to stop the vehicle at the stop position; an operation terminal (3) configured to be carried by a user and to transmit a control signal to the control device based on an input by the user, the control signal being a signal to control progress of the remote automatic moving processing; and a position determination unit (21) mounted on the vehicle and/or the operation terminal and configured to measure a distance between the operation terminal and the vehicle, wherein when the control device determines that the distance exceeds a first threshold based on a signal from the position determination unit, the control device stops the vehicle and transmits an output signal to the operation terminal, the output signal being a signal to cause the operation terminal to output a fact that the distance exceeds the first threshold.

According to this arrangement, the operation terminal outputs the fact that the distance exceeds the first threshold, so that the user can recognize the reason why the vehicle has stopped.

In the above arrangement, preferably, when the control device determines that the distance exceeds the first threshold based on the signal from the position determination unit, the control device stops the vehicle and causes the vehicle to issue a warning.

According to this arrangement, the vehicle issues the warning to the user when the user does not notice that the operation terminal outputs the fact that the distance exceeds the first threshold. Accordingly, it is possible to call user's attention and to prompt the user to check the content output by the operation terminal. Also, it is not necessary for the user to always pay attention to the warning issued by the vehicle, and thus the user is not prevented from monitoring the surroundings of the vehicle.

In the above arrangement, preferably, the control device is configured to move the vehicle in the remote automatic moving processing only when the user continues a prescribed input operation, and to cause the vehicle to issue the warning only when the distance exceeds the first threshold and the user continues the prescribed input operation.

When the user continues the prescribed input operation even though the vehicle has stopped, it is estimated that the user does not notice the output by the operation terminal. According to the above configuration, the warning is issued by the vehicle only when it is estimated that the user does not notice the output by the operation terminal, so that the frequency of the warning issued by the vehicle (the warning which may be annoying to the surroundings) can be decreased.

In the above arrangement, preferably, the control device does not cause the vehicle to issue the warning within a prescribed time after the control device stops the vehicle because the distance exceeds the first threshold during the remote automatic moving processing.

According to this arrangement, because the user is expected to voluntarily check the operation terminal within the prescribed time, the vehicle does not issue the warning to the user until the prescribed time elapses after the stop of the vehicle. Accordingly, the frequency of the warning issued by the vehicle (the warning which may be annoying to the surroundings) can be decreased.

In the above arrangement, preferably, when the control device stops the vehicle because the distance exceeds the first threshold during the remote automatic moving processing, the control device causes the operation terminal to output a recommended position where the user should be present to resume a movement of the vehicle based on the remote automatic moving processing.

According to this arrangement, the operation terminal outputs the recommended position when the vehicle stops, thereby prompting the user to move to the recommended position so as to promptly resume the movement of the vehicle.

In the above arrangement, preferably, when the control device determines that the distance exceeds a second threshold smaller than the first threshold based on the signal from the position determination unit, the control device transmits a warning start signal to the operation terminal, the warning start signal being a signal to cause the operation terminal to issue a warning.

According to this arrangement, the operation terminal issues the warning while the user is present within a prescribed area around the vehicle (namely, an area where the distance does not exceed the first threshold), thereby prompting the user to stay within the prescribed area around the vehicle. Accordingly, the remote automatic moving processing (for example, remote parking processing) can be continued without stopping the vehicle, so that the time required for the remote automatic moving processing can be prevented from being extended.

In the above arrangement, preferably, when the operation terminal receives the warning start signal, the operation terminal issues the warning that the distance approaches the first threshold.

Thus, according to the above arrangements, it is possible to provide a vehicle control system that can call user's attention when a relative distance between a user and a vehicle exceeds a prescribed value and thus the vehicle stops during remote automatic moving processing of the vehicle according to a remote operation.

BRIEF DESCRIPTION OF THE DRAWING(S)

FIG. 2B is an enlarged view of a part surrounded by a two-dot chain circle in FIG. 2A;

FIG. 3 is a front view of one of the ranging units;

FIG. 7A is an explanatory diagram showing a reference table;

FIG. 7B is an explanatory diagram showing a correction table;

DESCRIPTION OF THE PREFERRED EMBODIMENT(S)

In the following, a vehicle control system 1 (remote parking system) according to an embodiment of the present invention is described with reference to the drawings.

Figure 1:
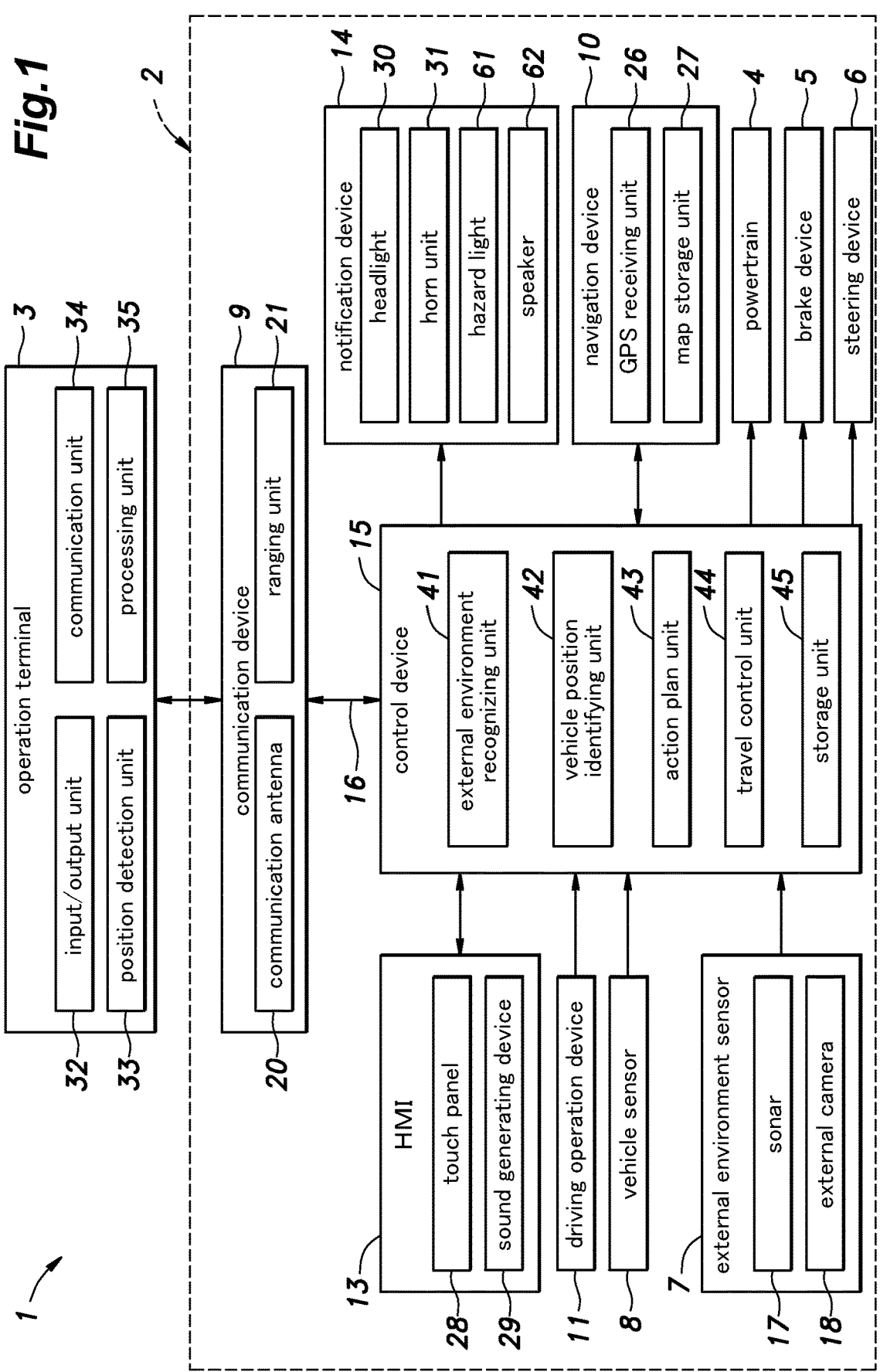
FIG. 1 is a functional block diagram of a vehicle control system.

As shown in FIG. 1, the vehicle control system 1 includes a vehicle system 2 mounted on a vehicle S and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, an HMI 13, a notification device 14, and a control device 15. The above components of the vehicle system 2 are connected by communication means such as a controller area network 16 (CAN) so that a signal can be transmitted between the above components.

The powertrain 4 is configured to apply a driving force to the vehicle S. The powertrain 4 includes a power source and a transmission, for example. The power source includes at least one of an internal combustion engine such as a gasoline engine and a diesel engine and an electric motor. The brake device 5 is configured to apply a brake force to the vehicle S. For example, the brake device 5 includes a brake caliper configured to press a brake pad against a brake rotor and an electric cylinder configured to supply an oil pressure to the brake caliper. The brake device 5 includes a parking brake device configured to restrict rotations of wheels via wire cables. The steering device 6 is configured to change a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 is configured to detect electromagnetic waves, sound waves, and the like from the periphery of the vehicle S to detect an object outside the vehicle S. The external environment sensor 7 includes sonars 17 and external cameras 18. The external environment sensor 7 may further include a millimeter wave radar or a laser lidar. The external environment sensor 7 outputs a detection result to the control device 15.

Each sonar 17 consists of the so-called ultrasonic sensor. Each sonar 17 emits ultrasonic waves around the vehicle S and captures the ultrasonic waves reflected by the object to detect a position (distance and direction) of the object. Plural sonars 17 are provided at a rear part and a front part of the vehicle S, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right surfaces of the vehicle S. That is, the vehicle S is provided with six pairs of sonars in total.

The external cameras 18 are configured to capture images around the vehicle S. Each external camera 18 consists of a digital camera using a solid imaging element such as a CCD or a CMOS, for example. The external cameras 18 include a front camera configured to capture an image of the front of the vehicle S and a rear camera configured to capture an image of the rear of the vehicle S.

The vehicle sensor 8 includes a vehicle speed sensor configured to detect the vehicle speed of the vehicle S, an acceleration sensor configured to detect the acceleration of the vehicle S, a yaw rate sensor configured to detect the angular velocity around a vertical axis of the vehicle S, and a direction sensor configured to detect the direction of the vehicle S. For example, the yaw rate sensor consists of a gyro sensor.

The communication device 9 is configured to mediate wireless communication between the control device 15 and the operation terminal 3. The control device 15 communicates with the operation terminal 3 carried by a user via the communication device 9 based on Bluetooth, which is a standard for short-distance wireless communication. In this way, by making communication based on Bluetooth, a general communication device such as a smartphone or a mobile phone can be used as the operation terminal 3.

The communication device 9 includes a communication antenna 20 (transmission antenna) and plural ranging units 21 (plural reception units). The communication antenna 20 consists of a transmission/reception antenna configured to mediate wireless data exchange (for example, wavelength thereof is 12 cm) between the control device 15 and the operation terminal 3 based on Bluetooth, and is fixed to the vehicle body B. The communication antenna 20 may be fixed inside a vehicle cabin or an engine compartment.

Each ranging unit 21 is configured to receive a ranging signal based on Bluetooth from the operation terminal 3 carried by the user and to measure (range) the distance from the operation terminal 3 to the vehicle S. Each ranging unit 21 is provided with unit ID (sensor ID). For example, the ranging signal may be an advertisement signal based on a Bluetooth Low Energy (BLE) standard. The advertisement signal is a signal transmitted from the operation terminal 3 that can execute remote parking of the vehicle S so as to notify the surrounding device (for example, the vehicle S) of the existence of the operation terminal 3 and thus establish a connection with the vehicle S.

Figure 2A:
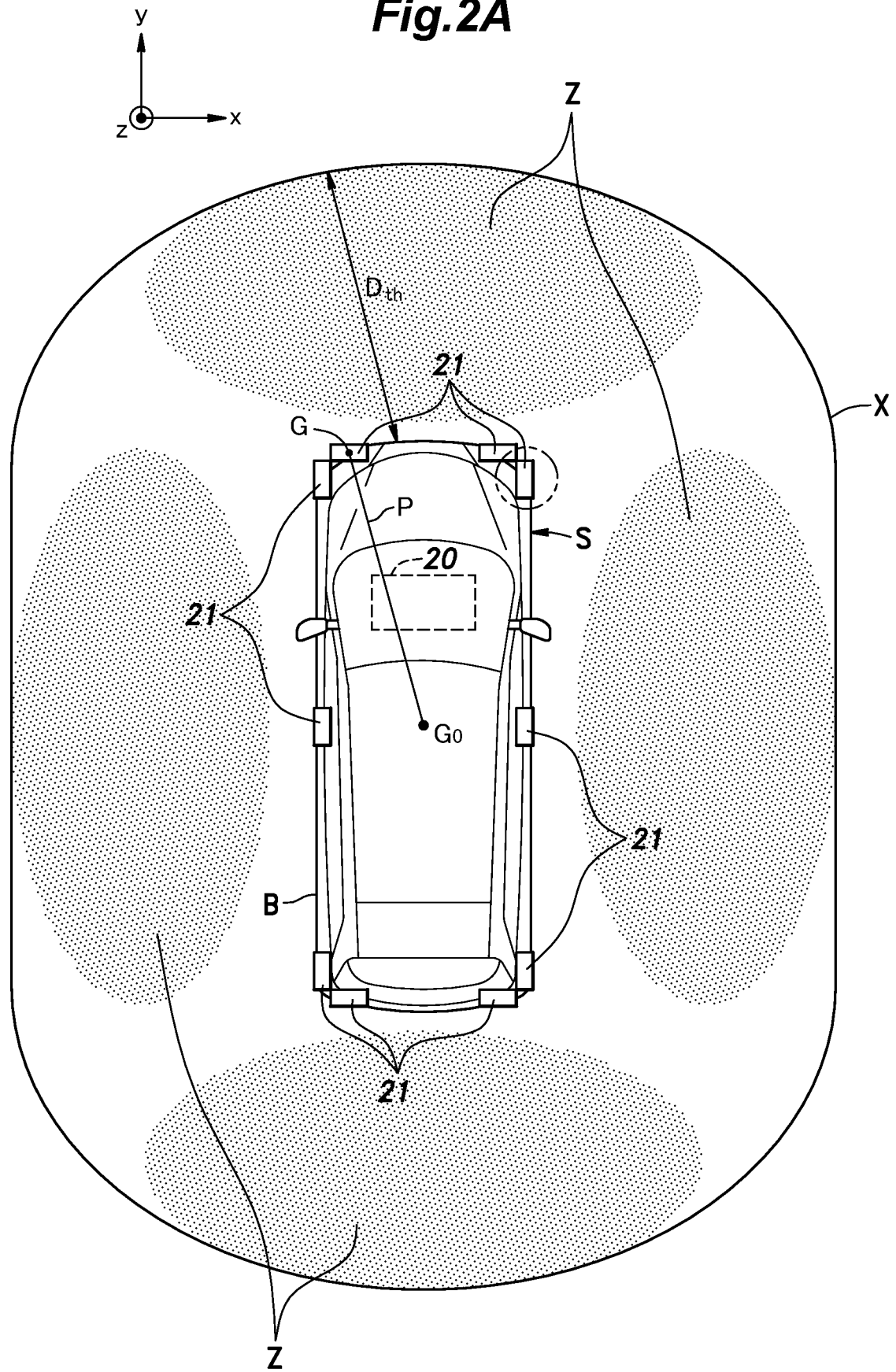
FIG. 2A is a plan view showing the arrangement of ranging units on a vehicle body and stably ranging areas.

As shown in FIG. 2A, the ranging units 21 are provided along an outer edge of the vehicle S (vehicle body B). The ranging units 21 are provided at least on left and right front edges and left and right rear edges of the vehicle S (vehicle body B). Thus, the ranging signal from the operation terminal 3 present in front of or behind the vehicle S can be received by the ranging units 21, and thus the area where the ranging signal can be stably received by the ranging units 21 can be enlarged as compared with a case where the ranging units 21 are provided only on a front surface or a rear surface of the vehicle S.

In the present embodiment, the ranging units 21 are respectively provided at both lateral ends on a front surface of the vehicle body B, at both lateral ends on a rear surface of the vehicle body B, at both fore-and-aft ends and a fore-and-aft center part on a left surface of the vehicle body B, and at both fore-and-aft ends and a fore-and-aft center part on a right surface of the vehicle body B. In FIG. 2A, the colored areas (dotted areas) indicate the areas where the ranging signal is stably received by the ranging units 21 when all the ranging units 21 are normally operating. In the following, the areas where the ranging signal is stably received by the ranging units 21 will be referred to as "stably ranging areas Z".

In FIG. 2A, a boundary (outer circumference) of an area where the user can monitor the movement of the vehicle S (hereinafter referred to as "monitorable area X") is shown by a solid oval. The monitorable area X is defined as an area where the distance from the vehicle S is equal to or less than a distance threshold $D_{th}$. In the present embodiment, the distance threshold $D_{th}$ is set to 6 m, and the position of the operation terminal 3 is regarded as being identical to the position of the user. Accordingly, when the operation terminal 3 is present in the monitorable area X, it is estimated that the user can monitor the movement of the vehicle S, so that the vehicle S can be moved by using the operation terminal 3.

In a case where all the ranging units 21 are operating normally, the stably ranging areas Z are located in the monitorable area X and set so as to substantially cover the monitorable area X. In a case where any of the ranging units 21 fail, the stably ranging areas Z in total become smaller as compared with a case where all the ranging units 21 are operating normally. When the user performs an operation input to the operation terminal 3 to move the vehicle S, it is desirable that the user (namely, the operation terminal 3) is present in the stably ranging areas Z.

As shown in FIG. 3, each ranging unit 21 includes a plate-shaped circuit board 22, plural antennas 23 (23a and 23b) provided on a surface of the circuit board 22, a communication IC 24, and a reception CPU 25 (processing device).

The circuit board 22 is a so-called printed circuit board on which wiring parts 22A are formed by using metal thin films (in the present embodiment, copper foil) provided on an insulator, such as an epoxy plate of several centimeters square. Each antenna 23 is formed by providing a metal thin film (in the present embodiment, copper foil) with a prescribed pattern on a surface of the printed circuit board. The shape of each antenna 23 is designed such that each antenna 23 can receive electromagnetic waves in a frequency band of 2.4 GHz, which is used in the communication based on Bluetooth. Accordingly, each antenna 23 can receive the ranging signal. The antennas 23 are provided on the surface of the circuit board 22, and thus the surface of the circuit board 22 functions as a reception surface 22S for receiving the ranging signal.

In the present embodiment, the circuit board 22 has a substantially rectangular shape, and the two antennas 23 are arranged along a short side of the circuit board 22. The distance d between the two antennas 23 is set to equal to or less than a half wavelength (more specifically, equal to or less than 60 mm). Each antenna 23 is formed in a substantially square shape, and is connected to the communication IC 24 via the prescribed wiring parts 22A.

Each ranging unit 21 is attached and fixed to the vehicle body B such that short sides of the circuit board 22 are substantially horizontal, the reception surface 22S faces an outside of the vehicle S, and the reception surface 22S of each ranging unit 21 is positioned at the same height (see FIG. 2B). Immediately after each ranging unit 21 is attached to the vehicle body B, each ranging unit 21 is arranged in a reference position P with a reference posture. As shown in FIG. 2A, the reference position P represents a position of the center G of the circuit board 22 of each ranging unit 21 with respect to the center $G_0$ of the vehicle body B (more specifically, the center of the vehicle body B both in the vehicle length direction and the vehicle width direction). In the present embodiment, the reference position P is represented by using a coordinate system in which the x-axis represents the vehicle width direction and the y-axis represents the vehicle length direction. Further, the reference posture represents the direction of the reception surface 22S at a time of shipment from a factory (namely, an initial value of the attachment direction of the reception surface 22S). The reference posture is represented by a rotation angle (hereinafter referred to as "reference angle $\delta$") around an up-down axis. The reference angle $\delta$ is set such that a state where the reception surface 22S faces forward is a basic state. Namely, the reference angle $\delta$ is set to "zero" in the state where the reception surface 22S faces forward. The reference angle $\delta$ is set such that the clockwise direction in a plan view is a positive direction. Namely, the reference angle $\delta$ increases as the reception surface 22S rotates in the clockwise direction in a plan view. The reference position P of each ranging unit 21 is set on an outer surface of the vehicle body B, and the reference angle $\delta$ of each ranging unit 21 is set such that the reception surface 22S extends along the outer surface of the vehicle body B.

As shown in FIG. 2A, in the present embodiment, the reference angle δ of the ranging units 21 provided on the front surface of the vehicle body B is set to 0 degree, the reference angle δ of the ranging units 21 provided on the rear surface of the vehicle body B is set to 180 degrees, the reference angle δ of the ranging units 21 provided on the right surface of the vehicle body B is set to 90 degrees, and the reference angle δ of the ranging units 21 provided on the left surface of the vehicle body B is set to 270 degrees. Thus, each ranging unit 21 is arranged such that the reception surface 22S faces the outside of the vehicle S and extends substantially along the outer surface of the vehicle body B.

Further, the ranging units 21 provided at the both lateral ends on the front surface of the vehicle body B are bilaterally symmetrical with each other, and thus the fore and aft positions of these ranging units 21 are identical to each other. Similarly, the ranging units 21 provided at the both lateral ends on the rear surface of the vehicle body B are bilaterally symmetrical with each other, and thus the fore and aft positions of these ranging units 21 are identical to each other. Further, the ranging units 21 provided on the right surface of the vehicle body B and the ranging units 21 provided on the left surface of the vehicle body B are bilaterally symmetrical with each other.

The communication IC 24 is a semiconductor chip including an integrated circuit. The communication IC 24 is soldered on the surface of the circuit board 22, and is connected to the plural antennas 23 (in the present embodiment, two antennas 23) and the reception CPU 25 on the circuit board 22 via the wiring parts 22A on the circuit board 22. When the respective antennas 23 receive signals, the communication IC 24 acquires the signals from the respective antennas 23, and thus outputs the phase difference between the acquired signals to the reception CPU 25 based on the change in the voltage of each signal and the time difference between the signals. In the present embodiment, the communication IC 24 acquires an electric potential (hereinafter referred to as "voltage") of each antenna 23 with respect to the ground (for example, the vehicle body B), and thus calculates the phase difference between the signals (voltages) received by the antennas 23 based on a time change in the voltage of each antenna 23.

Figure 4A:
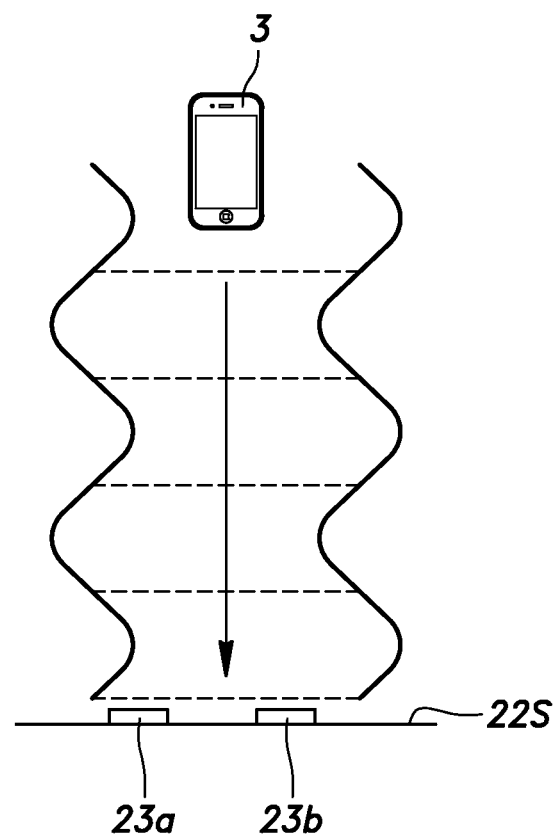
FIG. 4A is an explanatory diagram showing a ranging signal transmitted from an operation terminal such that the ranging signal is perpendicular to a reception surface in a plan view.
Figure 4B:
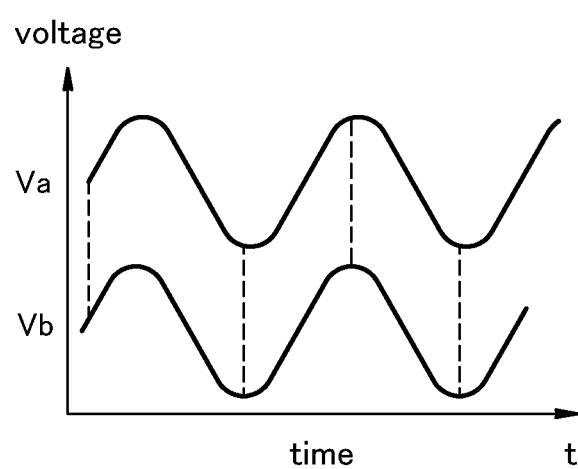
FIG. 4B is a graph showing a time change in a signal (voltage) received by each of two antennas in the case shown in FIG. 4A.
Figure 5A:
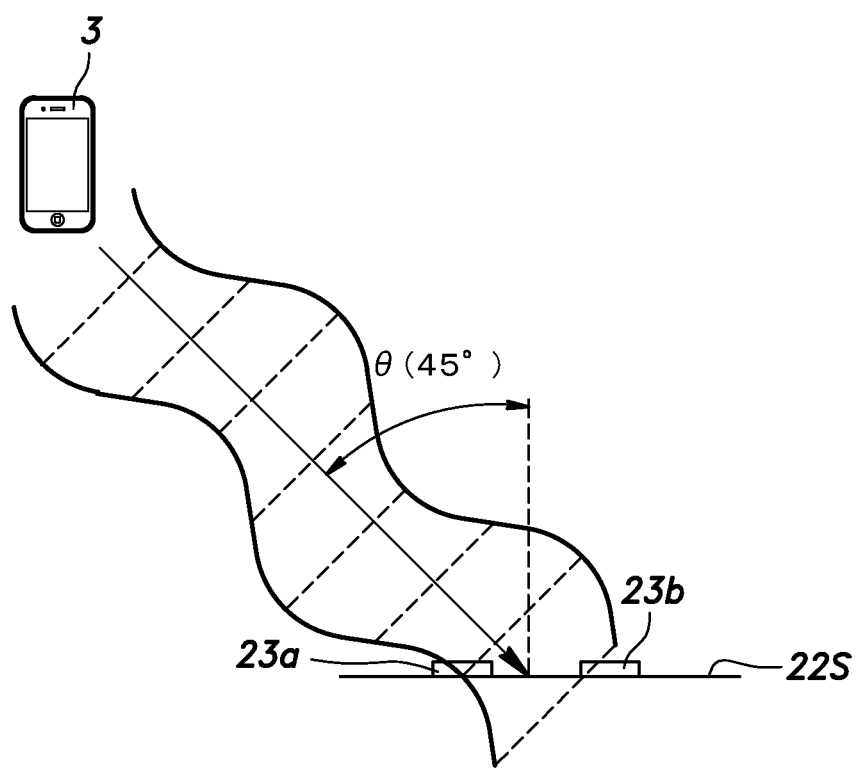
FIG. 5A is an explanatory diagram showing the ranging signal transmitted from the operation terminal such that the ranging signal is at 45 degrees to a perpendicular line of the reception surface in a plan view.
Figure 5B:
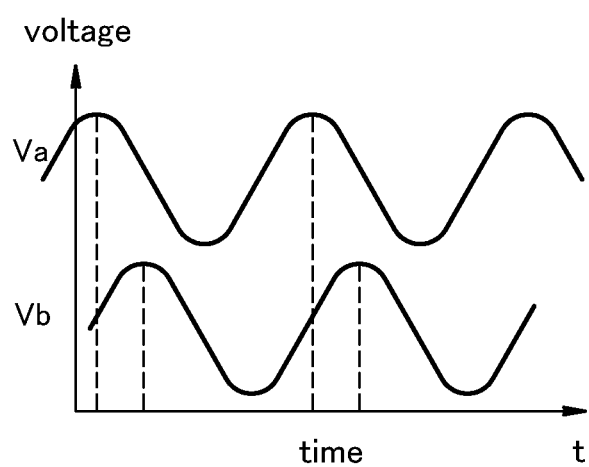
FIG. 5B is a graph showing a time change in a signal (voltage) received by each of two antennas in the case shown in FIG. 5A.

As shown in FIG. 4A, in a case where the ranging signal is transmitted from the operation terminal 3 such that the ranging signal is perpendicular to the reception surface 22S in a plan view, the voltages Va and Vb of the two antennas 23a and 23b change sinusoidally such that the phase difference between the voltages Va and Vb is zero (see FIG. 4B). On the other hand, as shown in FIG. 5A, in a case where the ranging signal is transmitted from the operation terminal 3 such that the ranging signal is at 45 degrees to a perpendicular line of the reception surface 22S in a plan view, the voltages Va and Vb of the two antennas 23a and 23b change sinusoidally such that the phase difference occurs between the voltages Va and Vb (see FIG. 5B).

The reception CPU 25 consists of a so-called central processing unit, and is configured to acquire (detect) an arrival direction of the ranging signal with respect to the reception surface 22S based on the phase difference output by the communication IC 24. The arrival direction corresponds to an angle formed between an incident direction of the ranging signal and a normal (perpendicular) of the reception surface 22S. Namely, the arrival direction corresponds to an incident angle of the ranging signal. The arrival direction is represented by an angle (hereinafter referred to as "arrival angle θ") formed between a straight line (hereinafter referred to as "reference line") and a travel direction of the ranging signal (see FIG. 6B). The reference line extends perpendicularly to the reception surface 22S so as to deviate from the center of the two antennas 23 in a top view. The arrival angle θ is determined such that the clockwise direction in a top view is a positive direction (namely, the arrival angle θ is determined such that the arrival angle θ>0 in FIG. 6B).

While the operation terminal 3 is transmitting the ranging signal, the arrival direction of the ranging signal is identical to the direction of the generating source of the ranging signal (namely, the direction of the operation terminal 3) with respect to the reception surface 22S. Accordingly, while the operation terminal 3 is transmitting the ranging signal, the reception CPU 25 can acquire the direction of the operation terminal 3 with respect to the reception surface 22S by acquiring the arrival direction of the ranging signal.

More specifically, in a case where the distance between the two antennas 23 is sufficiently smaller than the distance between each antenna 23 and the operation terminal 3 and the ranging signal received by each antenna 23 can be regarded as a plane wave, the arrival angle θ can be calculated by the following formula.

$$\theta = \sin^{-1}(\varphi \lambda / d)$$

In the above formula, d [mm] represents the distance between the two antennas 23, λ [mm] represents the wavelength of the ranging signal, and φ [rad] represents the phase difference between the antennas 23.

On receiving the ranging signal, the reception CPU 25 of each ranging unit 21 outputs the arrival angle θ and a reception intensity I of the ranging signal to the control device 15.

As shown in FIG. 1, the navigation device 10 is configured to acquire a current position of the vehicle S and to provide route guidance to a destination and the like. The navigation device 10 includes a GPS receiving unit 26 and a map storage unit 27. The GPS receiving unit 26 identifies a position (latitude and longitude) of the vehicle S based on a signal received from an artificial satellite (positioning satellite). The map storage unit 27 consists of a known storage device such as a flash memory or a hard disk, and stores map information.

The driving operation device 11 is provided in a vehicle cabin of the vehicle S and configured to accept an input operation (driving operation) by the user (driver) to control the vehicle S. The driving operation device 11 includes an accelerator pedal, a brake pedal, a steering wheel, a shift lever, and a push start switch (engine start button). The push start switch is configured to accept a starting operation of the vehicle S (the input operation to start operation of the vehicle S) by the user (driver). The driving operation device 11 may further include an element to activate the parking brake device.

The HMI 13 is configured to notify the user of various kinds of information by a display or a voice and to accept the input operation by the user. For example, the HMI 13 includes a touch panel 28 configured to accept the input operation by the user and a sound generating device 29 such as a buzzer or a speaker. The touch panel 28 includes a liquid crystal display, an organic EL display, or the like.

The notification device 14 is configured to give a notification to the user present outside the vehicle S by at least one of a sound and light. In the present embodiment, the notification device 14 includes headlights 30 (lights) configured to illuminate the front of the vehicle S and a horn unit 31 (a sound device) configured to generate a warning sound (horn) toward the outside of the vehicle S. The notification device 14 is configured to be activated based on a signal from the control device 15. More specifically, the headlights 30 are configured to blink based on the signal from the control device 15, and the horn unit 31 is configured to generate the warning sound toward the outside of the vehicle S based on the signal from the control device 15.

The control device 15 consists of an electronic control unit (ECU) that includes a CPU, a nonvolatile memory such as a ROM, a volatile memory such as a RAM, and the like. The CPU is configured to execute operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The at least one operation terminal 3 consists of a wireless terminal configured to be carried by the user and to communicate with the control device 15 from outside the vehicle S via the communication device 9. In the present embodiment, the operation terminal 3 consists of a smartphone. A prescribed application is installed on the operation terminal 3 in advance so that the operation terminal 3 can communicate with the control device 15.

The operation terminal 3 includes an input/output unit 32, a position detection unit 33, a communication unit 34, and a processing unit 35.

The input/output unit 32 is configured to provide information to the user operating the operation terminal 3 and to accept an input by the user operating the operation terminal 3. The input/output unit 32 consists of a touch panel, for example. On accepting the input by the user, the input/output unit 32 outputs a signal corresponding to the input to the processing unit 35.

The position detection unit 33 is configured to acquire positional information about the operation terminal 3. The position detection unit 33 may acquire the positional information about the operation terminal 3 by receiving a signal from a geodetic satellite (GPS satellite), for example. The position detection unit 33 is configured to output the acquired positional information about the operation terminal 3 to the processing unit 35.

The communication unit 34 is configured to mediate communication between the operation terminal 3 and the control device 15. The communication unit 34 includes an antenna to exchange a wireless signal (more specifically, a wireless signal in a frequency band corresponding to the standard of Bluetooth) with an outside device (for example, the communication device 9) based on the signal from the processing unit 35.

The processing unit 35 is configured to execute processing corresponding to an application based on the input to the input/output unit 32 by the user, the wireless signal received by the communication unit 34, and the signal from the control device 15. Further, the processing unit 35 is configured to appropriately cause the input/output unit 32 to display the result of the executed processing and to appropriately control the communication unit 34 so as to cause the communication unit 34 to transmit the wireless signal to the outside device (for example, the communication device 9). More specifically, when the user inputs a starting instruction (an instruction to start an application for executing the remote operation of the vehicle S) to the input/output unit 32, the processing unit 35 controls the communication unit 34 so as to cause the communication unit 34 to transmit the ranging signal (more specifically, the advertising signal) at regular time intervals.

When at least two of the ranging units 21 are normally operating (namely, at least two of the ranging units 21 can measure the distance) and the operation terminal 3 is present in the monitorable area X, the control device 15 controls the vehicle S based on the operation input to the operation terminal 3, and thus executes the so-called remote parking to move the vehicle S to a prescribed parking position and to park the vehicle S at the parking position. In order to execute this control of the vehicle S, the control device 15 includes an external environment recognizing unit 41, a vehicle position identifying unit 42, an action plan unit 43, a travel control unit 44, and a storage unit 45.

The external environment recognizing unit 41 is configured to recognize an object (for example, an obstacle such as a parked vehicle or a wall) present around the vehicle S based on the detection result of the external environment sensor 7 and to acquire information about the obstacle. Further, the external environment recognizing unit 41 is configured to analyze images captured by the external cameras 18 based on a known image analysis method such as pattern matching, to determine whether the obstacle is present, and to acquire the size of the obstacle in a case where the obstacle is present. Further, the external environment recognizing unit 41 may calculate a distance to the obstacle based on signals from the sonars 17 to acquire the position of the obstacle.

The vehicle position identifying unit 42 is configured to identify the position of the vehicle S (own vehicle) based on a signal from the GPS receiving unit 26 of the navigation device 10. Further, the vehicle position identifying unit 42 may acquire the vehicle speed and the yaw rate of the vehicle S from the vehicle sensor 8 in addition to the signal from the GPS receiving unit 26 so as to identify the position and the posture of the vehicle S by so-called inertial navigation.

The external environment recognizing unit 41 is configured to analyze the detection result of the external environment sensor 7 (more specifically, the images captured by the external cameras 18) based on a known image analysis method such as pattern matching and to recognize a position of a white line on a road surface of a parking area, for example.

The travel control unit 44 is configured to control the powertrain 4, the brake device 5, and the steering device 6 based on a travel control instruction (moving instruction) from the action plan unit 43 and to cause the vehicle S to travel.

The storage unit 45 consists of a RAM and the like, and is configured to store information necessary for executing processing of the action plan unit 43 and the travel control unit 44.

The storage unit 45 is configured to store a reference table (see FIG. 7A). In the reference table, the unit ID of each ranging unit 21 provided on the vehicle body B, the reference position P of each ranging unit 21, and the reference angle δ of each ranging unit 21 are associated with each other. Further, the storage unit 45 is configured to store information about an outline of the vehicle body B (hereinafter referred to as "outline information").

Further, the storage unit 45 is configured to store the arrival angle θ of an initial test signal received by each ranging unit 21 as "initial angle φ", and an intensity of the initial test signal as "initial intensity $I_0$" in the reference table such that the initial angle φ and the initial intensity $I_0$ are associated with the unit ID. The initial test signal is a test signal (a ranging signal with a predetermined intensity transmitted from the communication antenna 20) after each ranging unit 21 is attached to the vehicle body B and before the vehicle S is shipped from a factory. The initial angle φ and the initial intensity $I_0$ may be acquired by vehicle testing carried out after each ranging unit 21 (communication antenna 20) is attached to the vehicle body B and before the vehicle S is shipped, or may be calculated by a simulation.

When the HMI 13 or the operation terminal 3 accepts an input by the user, the action plan unit 43 calculates a trajectory (traveling route) of the vehicle S and outputs the travel control instruction to the travel control unit 44, if necessary.

<Parking Assist Processing>

Figure 8:
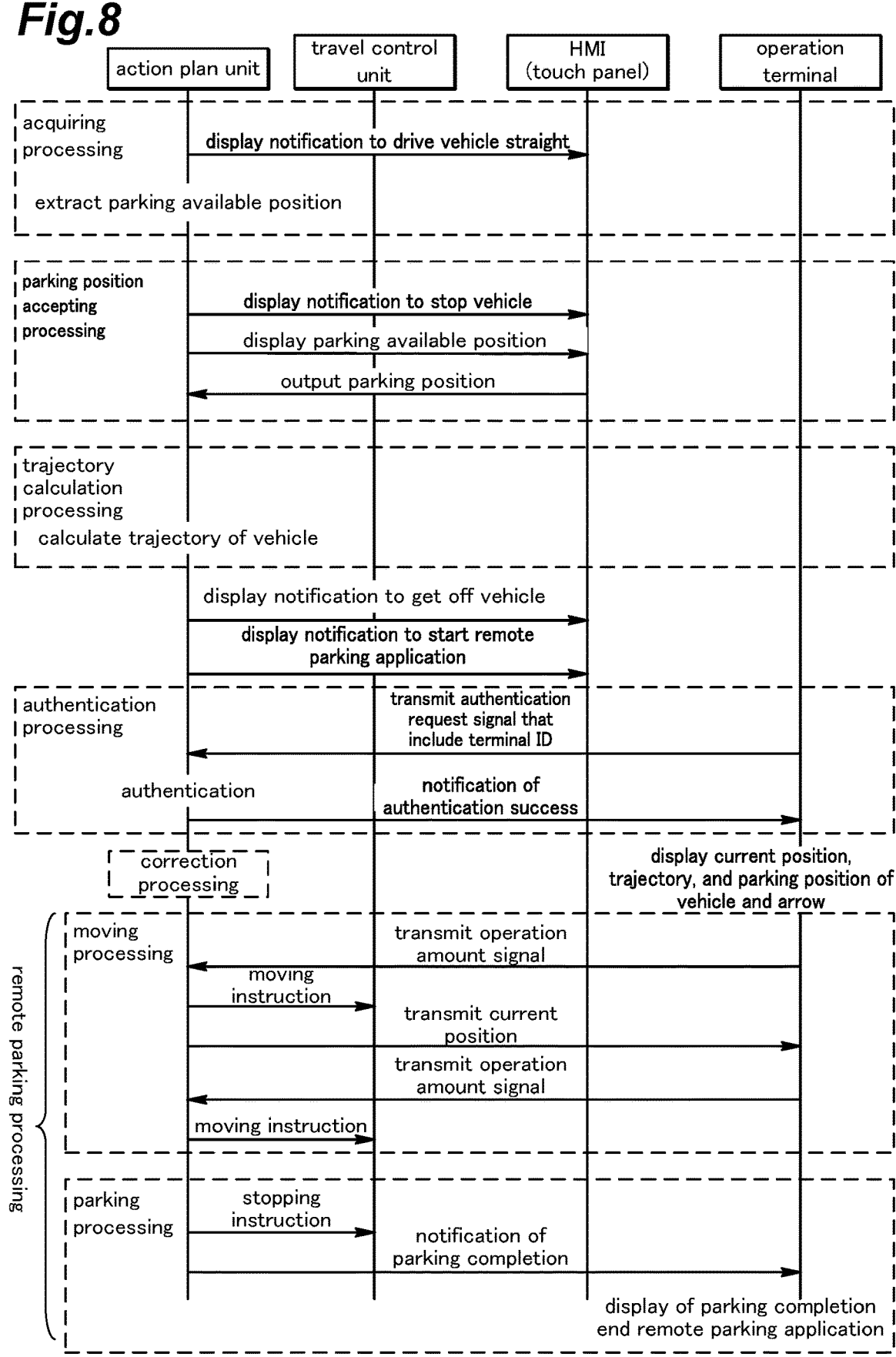
FIG. 8 is a sequence diagram showing parking assist processing.

When the user performs an input corresponding to desire for parking assistance by a remote operation after the vehicle S has stopped, the action plan unit 43 executes parking assist processing. In the following, the parking assist processing will be described with reference to a sequence diagram of FIG. 8.

First, the action plan unit 43 executes acquiring processing to acquire at least one space to park the vehicle S (hereinafter referred to as "parking available position"). More specifically, the action plan unit 43 causes the touch panel 28 of the HMI 13 to display a notification that instructs the user (driver) to drive the vehicle S straight. While the user (driver) is driving the vehicle S straight, the action plan unit 43 acquires the position and the size of the obstacle and the position of the white line on the road surface based on the signal from the external environment sensor 7. The action plan unit 43 extracts the at least one parking available position based on the position and the size of the obstacle and the position of the white line.

Next, the action plan unit 43 executes parking position accepting processing to accept a selection of the parking position from the at least one parking available position. More specifically, the action plan unit 43 causes the touch panel 28 to display a notification that instructs the user to stop the vehicle S, in a case where the action plan unit 43 extracts the at least one parking available position in the above acquiring processing. At this time, the action plan unit 43 may cause the touch panel 28 to also display a notification that instructs the user to change a position of the shift lever to the parking position after the vehicle S has stopped.

Next, the action plan unit 43 causes the touch panel 28 to display the current position of the vehicle S and the at least one parking available position. At this time, the action plan unit 43 may cause the touch panel 28 to display the current position of the vehicle S and the at least one parking available position on the image acquired by the external cameras 18. After that, the action plan unit 43 causes the touch panel 28 to display a notification that instructs the user to select the parking position from the at least one parking available position. When the user inputs a desired parking position to the touch panel 28, the touch panel 28 outputs a signal corresponding to the inputted parking position to the action plan unit 43.

Next, when the action plan unit 43 receives the parking position inputted by the user from the touch panel 28, the action plan unit 43 executes trajectory calculation processing to calculate a trajectory of the vehicle S from the current position to the parking position. In a case where the user performs the input to select a parking direction, the action plan unit 43 may calculate the trajectory of the vehicle S based on not only the current position and the parking position but also the parking direction selected by the user.

When the calculation of the trajectory of the vehicle S is completed, the action plan unit 43 causes the touch panel 28 to display a notification that prompts the user to get off the vehicle S and a notification that instructs the user to start dedicated application software for remote parking processing (hereinafter referred to as "remote parking application") by using the operation terminal 3. According to these notifications, the user gets off the vehicle S, and then starts the remote parking application by using the operation terminal 3.

After that, an input button for connecting the operation terminal 3 to the vehicle S is displayed on the input/output unit 32 of the operation terminal 3. When the user touches the input button, the processing unit 35 of the operation terminal 3 causes the communication unit 34 to transmit the ranging signal (namely, the advertisement signal) at regular time intervals. On receiving the ranging signal via the communication antenna 20, the action plan unit 43 communicates with the operation terminal 3 and thus executes authentication processing to authenticate the operation terminal 3. When the authentication of the operation terminal 3 is completed (succeeds), the action plan unit 43 executes correction processing. More specifically, the correction processing includes processing for determining whether at least two ranging units 21 required for measuring the distance are normally operating and thus the remote parking can be executed. Further, the correction processing includes processing for acquiring a correction angle ε for correcting the arrival angle θ actually detected by each ranging unit 21 to the arrival angle θ to be detected by each ranging unit 21 at the time of shipment from the factory (hereinafter referred to as "arrival angle correction value θ*"), namely, at a time when each ranging unit 21 is in the reference posture. Details of the correction processing will be described later.

In a case where the remote parking can be executed, the action plan unit 43 transmits a start signal to the operation terminal 3. The start signal includes the current position, the trajectory, and the parking position of the vehicle S. When the operation terminal 3 receives the start signal, the input/output unit 32 of the operation terminal 3 displays the current position, the trajectory, and the parking position of the vehicle S. Simultaneously, the input/output unit 32 of operation terminal 3 may display a bidirectional arrow directed both upward and downward and notify the user that the operation input to the input/output unit 32 can be performed by an upward or downward swiping operation. After that, the user performs the operation input to the input/output unit 32 by the swiping operation, so that the user can instruct the action plan unit 43 to execute the remote parking processing. The remote parking processing includes moving processing to move the vehicle S to the parking position and parking processing to park the vehicle S at the parking position.

In a case where the remote parking cannot be executed, the action plan unit 43 transmits a failure notification signal to the operation terminal 3 so as to cause the operation terminal 3 to notify the user of a failure (abnormality) of each ranging unit 21. Accordingly, the input/output unit 32 of the operation terminal 3 displays a notification to notify the user of the failure of each ranging unit 21. At this time, the action plan unit 43 acquires failure information from the storage unit 45 and then transmits the failure notification signal including the failure information to the operation terminal 3. The failure information includes the unit ID of each ranging unit 21 whose failure is detected and the reference position P of this ranging unit 21. On acquiring the failure information, the operation terminal 3 may notify the user of the failure of each ranging unit 21, and the input/output unit 32 (touch panel) may display the position of each ranging unit 21 whose failure is detected. When the input/output unit 32 displays the above position, the action plan unit 43 ends the parking assist processing.

In this way, the position of each ranging unit 21 whose failure has determined (hereinafter, referred to as "failed ranging unit 21") is displayed on the input/output unit 32, so that the user can recognize the position of the failed ranging unit 21. Accordingly, the user can easily repair or replace the failed ranging unit 21.

As described above, in a case where the action plan unit 43 determines that the remote parking can be executed, the input/output unit 32 of the operation terminal 3 displays the current position, the trajectory, and the parking position of the vehicle S together with the bidirectional arrow. After that, the action plan unit 43 continuously executes terminal position determination processing at prescribed time intervals until the vehicle S moves to the parking position. In the terminal position determination processing, the action plan unit 43 determines whether the user can monitor the movement of the vehicle S. More specifically, in a case where the operation terminal 3 is present in an area where the distance from the operation terminal 3 to the vehicle S is equal to or less than the distance threshold $D_{th}$ (namely, in a case where the operation terminal 3 is present in the monitorable area X), the action plan unit 43 determines that the user can monitor the movement of the vehicle S. Otherwise, the action plan unit 43 determines that the user cannot monitor the movement of the vehicle S and thus prohibits the movement of the vehicle S. At this time, in a case where the vehicle S is moving, the action plan unit 43 stops the vehicle S. After that, the action plan unit 43 waits until the distance from the operation terminal 3 to the vehicle S becomes equal to or less than the distance threshold $D_{th}$. Further, in the terminal position determination processing, the action plan unit 43 acquires the distance from the operation terminal 3 to the vehicle S and the direction of the operation terminal 3 with respect to the vehicle S (namely, the direction of the operation terminal 3 as seen from the vehicle S).

When the user performs the operation input by the swiping operation along the bidirectional arrow displayed on the input/output unit 32, the operation terminal 3 transmits an operation amount signal (a signal corresponding to an amount of the swiping operation) to the action plan unit 43.

In a case where the communication antenna 20 receives the operation amount signal when the operation terminal 3 is present in the monitorable area X (an area where the distance from the operation terminal 3 to the vehicle S is equal to or less than the distance threshold $D_{th}$), the action plan unit 43 converts the operation amount signal into a moving distance of the vehicle S. On the other hand, in a case where the communication antenna 20 receives the operation amount signal when the operation terminal 3 is present outside the monitorable area X, the action plan unit 43 prohibits the movement of the vehicle S and waits until the distance from the operation terminal 3 to the vehicle S becomes equal to or less than the distance threshold $D_{th}$.

When the conversion from the operation amount signal into the moving distance of the vehicle S is completed, the action plan unit 43 calculates the direction to move the vehicle S (hereinafter referred to as "moving direction") based on the current position and the trajectory of the vehicle S. Further, the action plan unit 43 calculates an estimated position of the vehicle S in a case where the vehicle S moves along the trajectory by the moving distance.

Next, the action plan unit 43 determines whether the operation terminal 3 is present in the moving direction of the vehicle S and the distance from the operation terminal 3 to the vehicle S is equal to or less than the moving distance based on the distance from the operation terminal 3 to the vehicle S, the direction of the operation terminal 3 with respect to the vehicle S, the moving distance, and the moving direction. In a case where the operation terminal 3 is present in the moving direction of the vehicle S and the distance from the operation terminal 3 to the vehicle S is equal to or less than the moving distance, the action plan unit 43 stops the vehicle S and then transmits a warning signal to the operation terminal 3. When the operation terminal 3 receives the warning signal, the input/output unit 32 of the operation terminal 3 displays a notification (warning) that prompts the user to evacuate. Accordingly, it is possible to prevent the vehicle S from coming into contact with the user holding the operation terminal 3, so that the safety of the vehicle S can be enhanced. Further, by displaying the warning on the operation terminal 3, the user can easily recognize that the user needs to evacuate.

Further, the action plan unit 43 may activate the notification device 14 after transmitting the warning signal. More specifically, the action plan unit 43 blinks the headlights 30 and activates the horn unit 31 to generate the warning sound, thereby warning the user that the vehicle S is approaching the user. In another embodiment, at this time, the action plan unit 43 may either blink the headlights 30 or activate the horn unit 31. The user can easily recognize that the user needs to evacuate according to the notification by the notification device 14, so that the safety of the vehicle S can be further enhanced. Also, by using a device such as the headlights 30 and the horn unit 31 (namely, a device that has already been installed in the vehicle S or a device that is generally installed in the vehicle S) as the notification device 14, the notification (warning) can be easily given to the user.

Further, in a case where the operation terminal 3 is not present in the moving direction of the vehicle S or the distance from the operation terminal 3 to the vehicle S is greater than the moving distance, the action plan unit 43 controls the vehicle S and thus executes the moving processing to move the vehicle S to the estimated position.

The period from a time when the user performs the operation input to the input/output unit 32 of the operation terminal 3 to a time when the movement of the vehicle S to the estimated position is completed is sufficiently short, and the vehicle S moves according to the swiping operation. When the user stops touching the input/output unit 32 (namely, when the user stops the swiping operation), the vehicle S stops immediately.

In the moving processing, the action plan unit 43 determines whether the vehicle S has reached the parking position. In a case where the action plan unit 43 determines that the vehicle S has reached the parking position, the action plan unit 43 executes the parking processing to park the vehicle S. In a case where the vehicle S has not reached the parking position, the action plan unit 43 moves the vehicle S to the estimated position and stops the vehicle S at the estimated position, and then waits until receiving the operation amount signal.

In the parking processing, the action plan unit 43 first activates the brake device 5, and then activates the parking brake device. When the parking processing is completed (namely, when the parking of the vehicle S is completed), the action plan unit 43 transmits a notification of parking completion (a notification to indicate that the parking of the vehicle S is completed) to the operation terminal 3.

When the operation terminal 3 receives the notification of parking completion, the input/output unit 32 of the operation terminal 3 displays a notification to indicate that the parking of the vehicle S is completed, and the operation terminal 3 ends the remote parking application. Thereby, the parking assist processing is completed.

<The Correction Processing>

Figure 9:
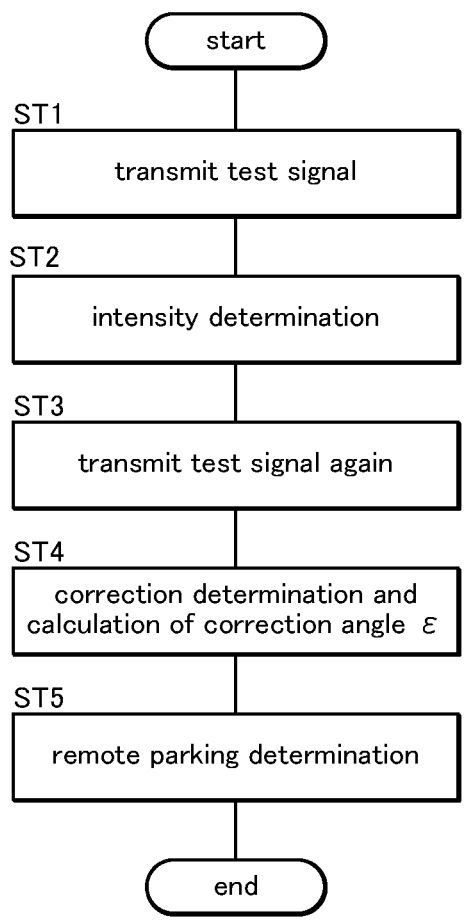
FIG. 9 is a flowchart showing correction processing.

Next, with reference to a flowchart shown in FIG. 9, the details of the correction processing will be described.

On starting the correction processing, the action plan unit 43 first causes the communication antenna 20 to transmit the test signal to all the ranging units 21 (ST1).

When the transmission of the test signal is completed, the action plan unit 43 acquires the reception intensity I of the test signal from all the ranging units 21, and thus determines whether the acquired reception intensity I and the corresponding initial intensity $I_0$ (namely, the initial intensity $I_0$ of each ranging unit 21 from which the reception intensity I is acquired) are substantially identical to each other. Namely, the action plan unit 43 makes an intensity determination. At this time, in a case where the absolute value of the difference between the acquired reception intensity I and the corresponding initial intensity $I_0$ is equal to or less than a prescribed determination value, the action plan unit 43 may determine that the acquired reception intensity I and the corresponding initial intensity $I_0$ are substantially identical to each other. After that, the action plan unit 43 causes the storage unit 45 to store intensity information in a correction table shown in FIG. 7B (ST2). The intensity information includes the unit ID of each ranging unit 21, the reception intensity I corresponding to the unit ID, and an intensity determination result that indicates whether the acquired reception intensity I and the corresponding initial intensity $I_0$ are substantially identical to each other.

Next, the action plan unit 43 causes the communication antenna 20 to transmit the test signal to all the ranging units 21 again (ST3).

After that, the action plan unit 43 refers to the correction table stored in the storage unit 45 and thus acquires the arrival angle θ from each ranging unit 21 whose reception intensity I is equal to or greater than a prescribed threshold (hereinafter referred to as "intensity threshold $I_{th}$"). After that, the action plan unit 43 determines whether the arrival angle θ acquired by each ranging unit 21 can be corrected by comparing the arrival angle θ acquired by each ranging unit 21 and the initial angle φ of each ranging unit 21. Namely, the action plan unit 43 makes a correction determination. In the present embodiment, in a case where the absolute value of the difference between the arrival angle θ acquired by each ranging unit 21 and the initial angle φ of each ranging unit 21 is equal to or less than a prescribed threshold, the action plan unit 43 determines that the arrival angle θ can be corrected. After that, the action plan unit 43 calculates the rotation angle of each ranging unit 21 with respect to the reference posture (namely, the posture at the time of shipment from the factory) based on the arrival angle θ of the test signal and the initial angle φ, and thus sets the calculated rotation angle to the correction angle ε. In the present embodiment, the action plan unit 43 calculates the correction angle ε (rotation angle) such that the clockwise direction in a top view is set to the positive direction. Further, at this time, the action plan unit 43 may calculate the correction angle ε (rotation angle) based on the difference between the arrival angle θ of the test signal and the initial angle φ. After that, as shown in FIG. 7B, the action plan unit 43 causes the storage unit 45 to store a correction determination result and the correction angle ε in the correction table such that the correction determination result and the correction angle ε are associated with the corresponding unit ID (ST4). The correction determination result is a determination result indicating whether the arrival angle θ of the test signal can be corrected.

When the correction angle ε and the correction determination result are stored in the storage unit 45, the action plan unit 43 determines whether the remote parking can be executed based on the intensity determination result and the correction determination result (ST5). Namely, the action plan unit 43 makes a remote parking determination. In the present embodiment, the action plan unit 43 refers to the correction table and thus determines whether the reception intensity I and the initial intensity $I_0$ of at least two ranging units 21 are substantially identical to each other and the arrival angle θ of the at least two ranging units 21 can be corrected. If the reception intensity I and the initial intensity $I_0$ of a specific ranging unit 21 is substantially different from each other or the arrival angle θ of the specific ranging unit 21 cannot be correct, a sensitivity or a posture of the specific ranging unit 21 is changed as compared with the time of shipment from the factory, and thus the specific ranging unit 21 is estimated to fail. In a case where at least two ranging units 21 do not fail, the distance from the operation terminal 3 to the vehicle S can be measured. Accordingly, in a case where the reception intensity I and the initial intensity $I_0$ of at least two ranging units 21 are substantially identical to each other and the arrival angle θ of the at least two ranging units 21 can be corrected, the action plan unit 43 determines that the remote parking can be executed and ends the correction processing. Otherwise, the action plan unit 43 determines that the remote parking cannot be executed, and the storage unit 45 stores the unit ID of the failed ranging unit 21 (namely, each ranging unit 21 whose reception intensity I and whose initial intensity $I_0$ are substantially different from each other or each ranging unit 21 whose arrival angle θ cannot be corrected). When the storage of the unit ID thereof is completed, the action plan unit 43 ends the correction processing.

In this way, by comparing the reception intensity I and the initial intensity $I_0$ or the arrival angle θ and the initial angle φ, the failure detection of each ranging unit 21 can be easily performed without separately preparing a device for the failure detection of each ranging unit 21.

<The Terminal Position Determination Processing>

Figure 10:
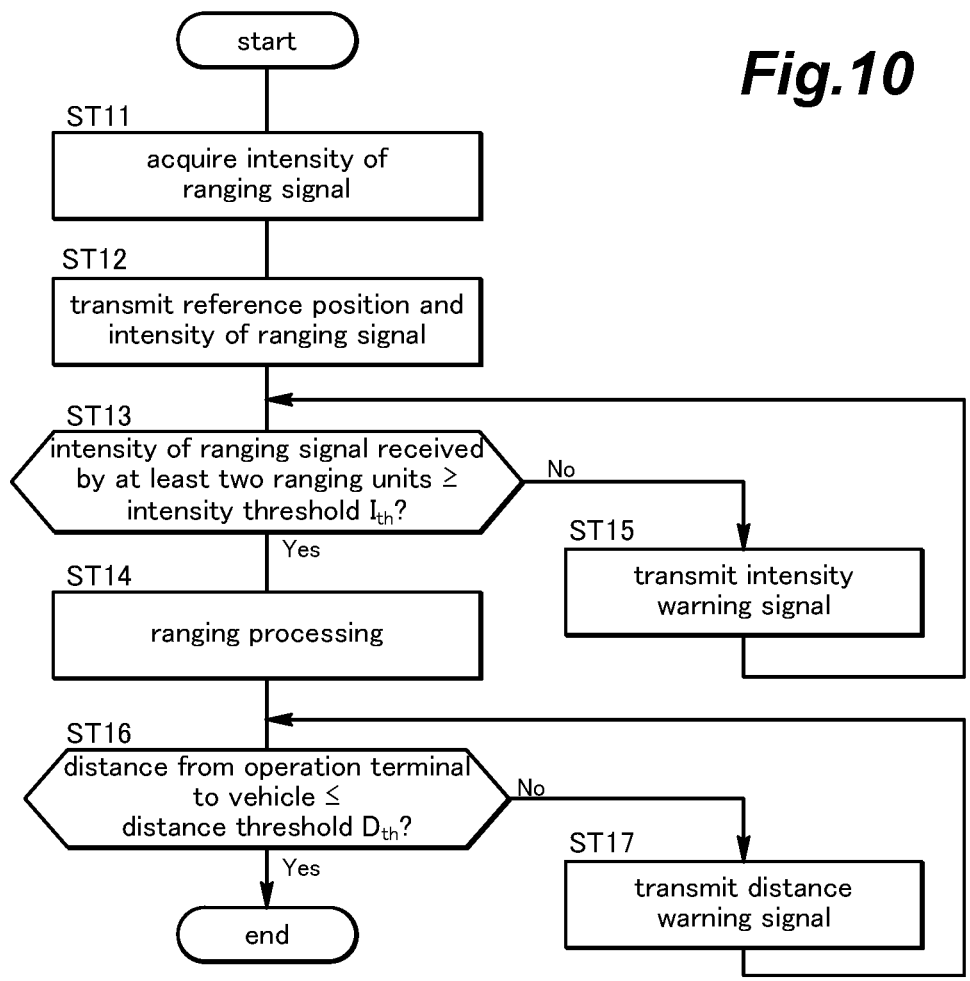
FIG. 10 is a flowchart showing terminal position determination processing.

Next, with reference to a flowchart shown in FIG. 10, details of the terminal position determination processing will be described.

On starting the terminal position determination processing, the action plan unit 43 first acquires the intensity of the ranging signal received by each ranging unit 21 from all the ranging units 21 other than the failed ranging unit 21 (ST11). After that, the action plan unit 43 refers to the storage unit 45 and thus acquires the reference position P of each ranging unit 21, and transmits an intensity signal to the operation terminal 3 (ST12). The intensity signal includes the unit ID, the reference position P of each ranging unit 21 corresponding to the unit ID, and the intensity of the ranging signal received by each ranging unit 21.

Next, the action plan unit 43 determines whether the intensity of the ranging signal received by at least two ranging units 21 other than the failed ranging unit 21 is equal to or greater than the intensity threshold $I_{th}$ (ST13). In a case where the action plan unit 43 determines that the intensity of the ranging signal received by at least two ranging units 21 is equal to or greater than the intensity threshold $I_{th}$, the action plan unit 43 executes ranging processing to calculate the distance from the operation terminal 3 to the vehicle S (more specifically, the distance from the operation terminal 3 to the vehicle S in a horizontal plane) (ST14). Accordingly, the action plan unit 43 acquires the distance from the operation terminal 3 to the vehicle S and the direction of the operation terminal 3 with respect to the vehicle S.

In a case where the action plan unit 43 determines that the intensity of the ranging signal received by at least two ranging units 21 is not equal to or greater than the intensity threshold $I_{th}$, the action plan unit 43 transmits an intensity warning signal to the operation terminal 3 so as to cause the input/output unit 32 of the operation terminal 3 to display a notification to indicate that the intensity of the ranging signal received by at least two ranging units 21 is not equal to or greater than the intensity threshold $I_{th}$ (ST15). For example, at this time, the input/output unit 32 of the operation terminal 3 displays a notification that prompts the user to approach the vehicle S. After that, the action plan unit 43 waits until the intensity of the ranging signal received by at least two ranging units 21 becomes equal to or greater than the intensity threshold $I_{th}$.

When the ranging processing is completed, the action plan unit 43 determines whether the calculated distance from the operation terminal 3 to the vehicle S is equal to or less than the distance threshold $D_{th}$ (ST16). In a case where the distance from the operation terminal 3 to the vehicle S is equal to or less than the distance threshold $D_{th}$, the action plan unit 43 determines that the operation terminal 3 is present in a position suitable for the movement of the vehicle S, and thus ends the terminal position determination processing.

In a case where the distance from the operation terminal 3 to the vehicle S is greater than the distance threshold $D_{th}$, the action plan unit 43 prohibits the movement of the vehicle S and transmits a distance warning signal (a signal to notify the user that the movement of the vehicle S is prohibited) to the operation terminal 3, and waits until the distance from the operation terminal 3 to the vehicle S becomes equal to or less than the distance threshold $D_{th}$ (ST17). When the operation terminal 3 receives the distance warning signal, the input/output unit 32 (touch panel) of the operation terminal 3 displays a notification to indicate that the distance from the operation terminal 3 to the vehicle S is long and thus the movement of the vehicle S is prohibited.

<The Ranging Processing>

Figure 11:
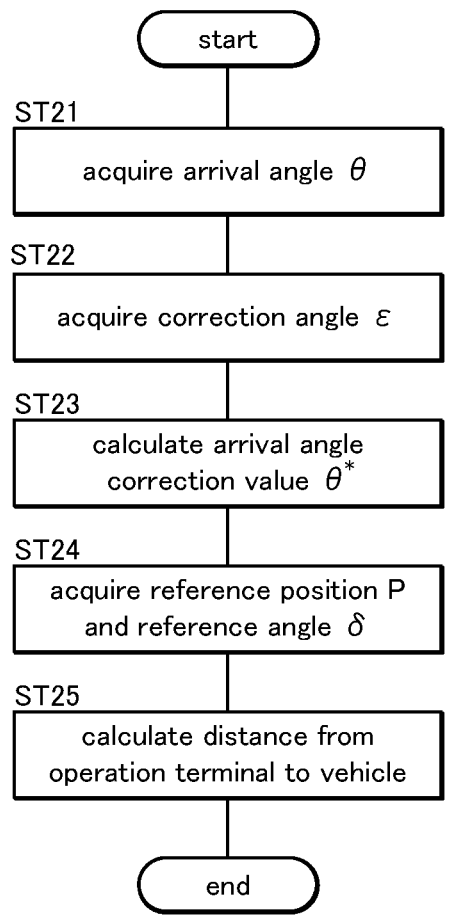
FIG. 11 is a flowchart of ranging processing.

Next, with reference to FIG. 11, the details of the ranging processing will be described. On starting the ranging processing, the action plan unit 43 acquires the arrival angle θ of the ranging signal from each ranging unit 21 whose intensity of the ranging signal is equal to or greater than the intensity threshold $I_{th}$ (ST21).

Figure 6A:
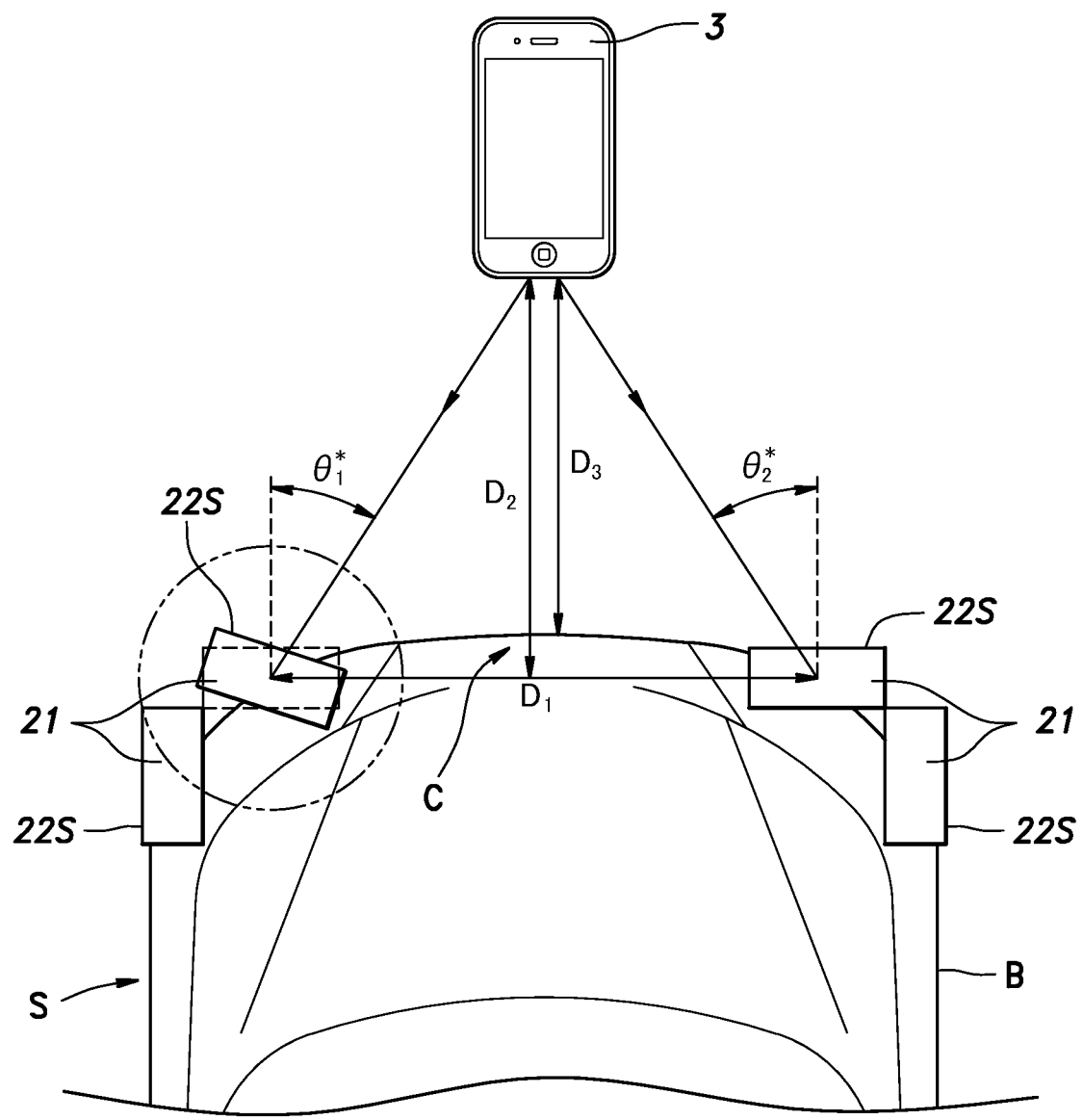
FIG. 6A is a plan view showing how a distance is measured by using the ranging units.
Figure 6B:
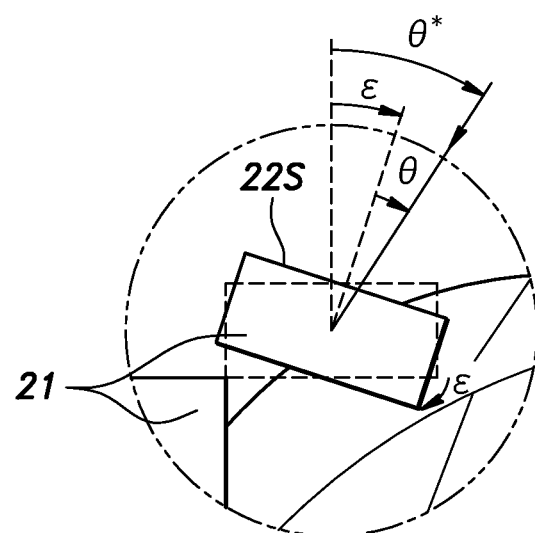
FIG. 6B is an enlarged view of a part surrounded by a two-dot chain circle in FIG. 6A.

On acquiring the arrival angle θ, the action plan unit 43 refers to the correction table, and thus acquires the correction angle ε of the corresponding ranging unit 21 (ST22). After that, the action plan unit 43 corrects the arrival angle θ by using the correction angle ε, and thus calculates (acquires) the arrival angle correction value θ* (the arrival angle θ to be detected by each ranging unit 21 at the time of shipment from the factory, namely, at the time when each ranging unit 21 is in the reference posture). For example, as shown in FIGS. 6A and 6B, the action plan unit 43 calculates the arrival angle correction value θ* by adding the correction angle ε to the arrival angle θ acquired by each ranging unit 21 provided on the front surface of the vehicle body B. The action plan unit 43 calculates the arrival angle correction value θ* for each ranging unit 21 whose intensity of the ranging signal is equal to or greater than the intensity threshold $I_{th}$ (ST23).

When the calculation of the arrival angle correction value θ* is completed, the action plan unit 43 acquires the corresponding reference position P and the corresponding reference angle δ set for each ranging unit 21 whose intensity of the ranging signal is equal to or greater than the intensity threshold $I_{th}$ by referring to the reference table stored in the storage unit 45 (ST24).

After that, the action plan unit 43 acquires the outline information (the information about the outline of the vehicle body B) stored in the storage unit 45. After that, the action plan unit 43 calculates (acquires) the distance from the operation terminal 3 to the vehicle S (more specifically, the distance from the operation terminal 3 to the outer surface of the vehicle S) based on the so-called trigonometry by using the reference position P, the reference angle δ, and the arrival angle correction value θ* of at least two ranging units 21 and the outline information (ST25).

More specifically, for example, in a case where two ranging units 21 provided at the both lateral ends on the front surface of the vehicle body B acquires the ranging signal whose intensity is equal to or greater than the intensity threshold $I_{th}$, the action plan unit 43 first acquires the distance $D_1$ between the two ranging units 21. Next, as shown in FIG. 6A, the action plan unit 43 calculates the fore-and aft distance $D_2$ between the ranging units 21 provided on the front surface of the vehicle body B and the operation terminal 3 based on the so-called trigonometry by using the distance $D_1$ between the ranging units 21 and the arrival angle correction values $θ^*_1$, and $θ^*_2$ of each ranging unit 21. After that, the action plan unit 43 selects (identifies) a closest part C (a part closest to the operation terminal 3) of the vehicle body B by using the outline information, and thus acquires the distance $D_3$ from the operation terminal 3 to the closest part C of the vehicle body B (namely, the distance from the operation terminal 3 to the vehicle S).

On acquiring the distance from the operation terminal 3 to the vehicle S, the action plan unit 43 ends the ranging processing.

<The Remote Parking Processing>

Figure 12:
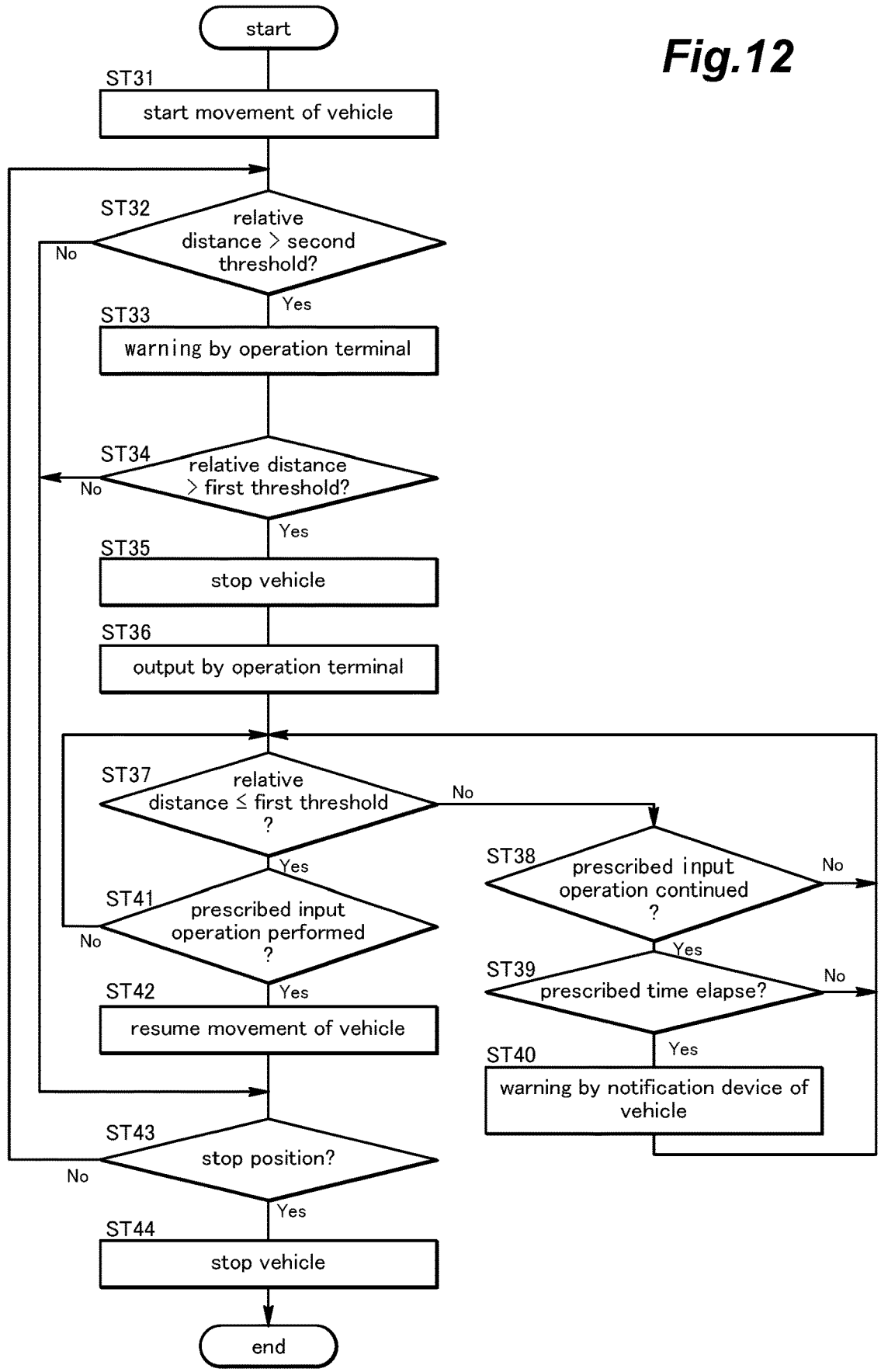
FIG. 12 is a flowchart of remote parking processing (an example of remote automatic moving processing).

Next, with reference to FIGS. 1 and 12, processing in a case where a relative distance between the operation terminal 3 and the vehicle S exceeds a prescribed value during the remote parking processing (an example of remote automatic moving processing) will be described. During the remote parking processing, the operation terminal 3 transmits a control signal (a signal to control progress of the remote parking processing) to the control device 15 based on an input by the user.

After the action plan unit 43 of the control device 15 calculates the trajectory (traveling route) of the vehicle S (the trajectory calculation processing of FIG. 8), the user alights from the vehicle S and moves to a position where the user performs the remote parking processing. When the user performs a prescribed input operation on the input/output unit 32 of the operation terminal 3, the travel control unit 44 of the control device 15 starts the movement of the vehicle S (namely, the vehicle S starts moving) from an initial position to a stop position (parking position) along the traveling route (step ST31, the moving processing in FIG. 8). The vehicle S keeps on moving in the remote parking processing while the user continues the prescribed input operation. During the remote parking processing, the action plan unit 43 calculates a relative distance between the operation terminal 3 and the vehicle S based on the signal from each ranging unit 21 (position determination unit). In a case where the relative distance exceeds a first threshold, or in a case where the relative distance exceeds a second threshold smaller than the first threshold, the control device 15 executes processing corresponding to each of these cases.

When the action plan unit 43 of the control device 15 determines that the relative distance exceeds the second threshold (Yes in step ST32), the action plan unit 43 transmits a warning start signal (a signal to cause the operation terminal 3 to issue a warning) to the operation terminal 3. When the operation terminal 3 receives the warning start signal, the processing unit 35 of the operation terminal 3 causes the input/output unit 32 to issue the warning that the relative distance is approaching the first threshold (step ST33). For example, the input/output unit 32 may issue the warning by displaying an image or a character and/or by generating a voice or a warning sound.

Next, when the action plan unit 43 of the control device 15 determines that the relative distance exceeds the first threshold (Yes in step ST34), the travel control unit 44 of the control device 15 stops the vehicle S (step ST35). Next, the action plan unit 43 transmits an output signal (a signal to cause the operation terminal 3 to output a fact that the vehicle S has stopped because the relative distance exceeds the first threshold) to the operation terminal 3. When the operation terminal 3 receives the output signal, the processing unit 35 of the operation terminal 3 causes the input/output unit 32 to output the fact that the vehicle S has stopped because the relative distance exceeds the first threshold (step ST36). For example, the input/output unit 32 may output the fact by displaying an image or a character and/or by generating a voice. Also, at this time, the input/output unit 32 may output a recommended position where the user should be present to resume the movement of the vehicle S. For example, the input/output unit 32 may output the recommended position by displaying an image.

Thereafter, in a case where the relative distance continues to exceed the first threshold (No in step ST37), the user continues the prescribed input operation (the input operation to execute the remote parking processing) on the operation terminal 3 (Yes in step ST38), and a prescribed time has elapsed after the stop of the vehicle S (Yes in step ST39), the notification device 14 of the vehicle S issues a warning (step ST40). For example, the notification device 14 of the vehicle S issues the warning by blinking the headlights 30 or hazard lights 61, by generating a warning sound by the horn unit 31, and/or by generating a warning sound or a message (more specifically, a message indicating that the relative distance exceeds the first threshold) from a speaker 62. In a case where the user does not perform the prescribed input operation on the operation terminal 3 (No in step ST38) or in a case where the prescribed time has not elapsed after the stop of the vehicle S (No in step ST39), the notification device 14 of the vehicle S does not issue the warning.

In a case where the user approaches the vehicle S, the relative distance becomes equal to or less than the first threshold (Yes in step ST37). After that, when the prescribed input operation is performed on the input/output unit 32 of the operation terminal 3 (Yes in step ST41), the travel control unit 44 resumes the movement of the vehicle S along the traveling route (step ST42).

After the movement of the vehicle S is resumed, or when the relative distance does not exceed the first threshold or the second threshold (No in step ST32 or step ST34) and thus the movement of the vehicle S continues, the control device 15 may determine that the vehicle S has arrived at the stop position (Yes in step ST43). In such a case, the travel control unit 44 stops and parks the vehicle S at the stop position (step ST44, the parking processing in FIG. 8). Until the vehicle S arrives at the stop position (No in step ST43), step ST32 and its following steps are repeated.

Because the vehicle S stops when the relative distance between the operation terminal 3 and the vehicle S exceeds the first threshold, the vehicle S can move only when the user is present within a prescribed area around the vehicle S (namely, an area where the relative distance does not exceed the first threshold). When the vehicle S is moving, it is not necessary for the user to pay attention to the vehicle S, so that the user is not prevented from monitoring the surroundings of the vehicle S. Also, the input/output unit 32 of the operation terminal 3 outputs the fact that the vehicle S has stopped because the relative distance exceeds the first threshold, so that the user can recognize that the vehicle S has stopped because the relative distance exceeds the first threshold and that the user needs to approach the vehicle S to resume the movement of the vehicle S.

By the way, during the remote operation of the vehicle S, the user monitors not the operation terminal 3 but the vehicle S or its surroundings. Accordingly, even if the input/output unit 32 of the operation terminal 3 displays (outputs) the fact that the vehicle S has stopped because the relative distance exceeds the first threshold, the user may continue the prescribed input operation on the operation terminal 3 without noticing the fact displayed by the operation terminal 3. Also, even if the input/output unit 32 generates a voice to notify the user that the vehicle S has stopped because the relative distance exceeds the first threshold, the user may not be able to hear the voice due to a background noise. In view of such a problem, in the present embodiment, the warning is issued by the vehicle S in a case where the relative distance exceeds the first threshold. Accordingly, it is possible to call attention of the user monitoring the vehicle S or its surroundings and to prompt the user to check the content output by the operation terminal 3.

In a case where the user continues the prescribed input operation on the operation terminal 3, it is estimated that the user does not notice that the relative distance exceeds the first threshold. As the vehicle S issues the warning only in such a case, the frequency of the warning issued by the vehicle S (the warning which may be annoying to the surroundings) can be decreased.

In addition, there is a possibility that the user checks the operation terminal 3 even if the vehicle S does not issue the warning. In view of such a possibility, the vehicle S does not issue the warning to the user until the prescribed time elapses after the stop of the vehicle S because the user is expected to voluntarily check the operation terminal 3 within the prescribed time. Accordingly, the frequency of the warning issued by the vehicle S (the warning which may be annoying to the surroundings) can be decreased.

Also, after the stop of the vehicle S, the input/output unit 32 outputs the recommended position where the user should be present to resume the movement of the vehicle S, thereby prompting the user to move to the recommended position so as to promptly resume the movement of the vehicle S.

Further, the operation terminal 3 issues the warning while the user is present within a prescribed area around the vehicle S (namely, an area where the relative distance is equal to or less than the first threshold), thereby prompting the user to stay within the prescribed area around the vehicle S. Accordingly, the user can stay within the prescribed area around the vehicle S and thus the remote parking processing can be continued without stopping the vehicle S, so that the time required for the remote parking processing can be prevented from being extended.

Concrete embodiments of the present invention have been described in the foregoing, but the present invention should not be limited by the foregoing embodiments and various modifications and alterations are possible within the scope of the present invention. For example, in another embodiment, the control device 15 may be mounted on the operation terminal 3. Further, in another embodiment, the present invention may be applied not only to the remote parking processing but also to remote automatic moving processing other than the remote parking processing (for example, remote unparking processing to unpark the vehicle S from a parking position to a prescribed position). Also, in another embodiment, the position determination unit for calculating a relative distance between the operation terminal 3 and the vehicle S may consist of not the ranging units 21 but a ranging device mounted on the operation terminal 3. In still another embodiment, the position determination unit may consist of the position detection unit 33 of the operation terminal 3 and/or the vehicle position identifying unit 42 of the vehicle S.

The invention claimed is:

1. A vehicle control system comprising:
   a control device mounted on a vehicle and configured to execute remote automatic moving processing based on an output from an external environment sensor, the remote automatic moving processing being processing to move the vehicle from an initial position to a stop position and to stop the vehicle at the stop position;
   an operation terminal configured to be carried by a user and to transmit a control signal to the control device based on an input by the user, the control signal being a signal to control progress of the remote automatic moving processing; and
   a position determination unit mounted on the vehicle and/or the operation terminal and configured to measure a distance between the operation terminal and the vehicle,
   wherein when the control device determines that the distance exceeds a first threshold based on a signal from the position determination unit, the control device stops the vehicle and transmits an output signal to the operation terminal, the output signal being a signal to cause the operation terminal to output a fact that the distance exceeds the first threshold,
   wherein when the control device determines that the distance exceeds the first threshold based on the signal from the position determination unit, the control device stops the vehicle and causes the vehicle to issue a warning,
   wherein the control device is configured to move the vehicle in the remote automatic moving processing only when the user continues a prescribed input operation,
   wherein the control device is configured to cause the vehicle to issue the warning only when the distance exceeds the first threshold and the user continues the prescribed input operation, and after a prescribed time has elapsed since the control device stops the vehicle because the distance exceeds the first threshold during the remote automatic moving processing.

2. The vehicle control system according to claim 1, wherein when the control device stops the vehicle because the distance exceeds the first threshold during the remote automatic moving processing, the control device causes the operation terminal to output a recommended position where the user should be present to resume a movement of the vehicle based on the remote automatic moving processing.

3. The vehicle control system according to claim 1, wherein when the control device determines that the distance exceeds a second threshold smaller than the first threshold based on the signal from the position determination unit, the control device transmits a warning start signal to the operation terminal, the warning start signal being a signal to cause the operation terminal to issue a warning.

4. The vehicle control system according to claim 3, wherein when the operation terminal receives the warning start signal, the operation terminal issues the warning that the distance approaches the first threshold.

* * * * *